Dec. 10, 1968

J. S. NABER 3,416,000

ELECTRICAL SYSTEM FOR A PLURALITY OF APPLIANCES
OPERATED AT RANDOM TIMES
Filed June 7, 1965

INVENTOR
JOSEPH S. NABER
by
Mason, Kolehmainen, Rathburn and Wyss
ATTORNEYS.

United States Patent Office 3,416,000
Patented Dec. 10, 1968

3,416,000
ELECTRICAL SYSTEM FOR A PLURALITY OF
APPLIANCES OPERATED AT RANDOM TIMES
Joseph S. Naber, Wheeling, Ill., assignor to Fastener Corporation, Franklin Park, Ill., a corporation of Illinois
Filed June 7, 1965, Ser. No. 461,703
2 Claims. (Cl. 307—11)

ABSTRACT OF THE DISCLOSURE

An electrical system including a common source of A.C. potential and a plurality of electrically powered appliances, each including a circuit comprising a unidirectional conducting device in series with a load and switch means operable at random times with respect to said A.C. source for rendering said device conductive; first polarized conductor means are provided for connecting the circuits of a first group of said appliances to said A.C. source for conduction through the load thereof only during half cycles of alternating current of one polarity and second polarized connector means are provided for connecting the circuits of a second group of said appliances to said A.C. source for conduction through the loads thereof only during half cycles of alternating current of an opposite polarity.

---

Figure 1:
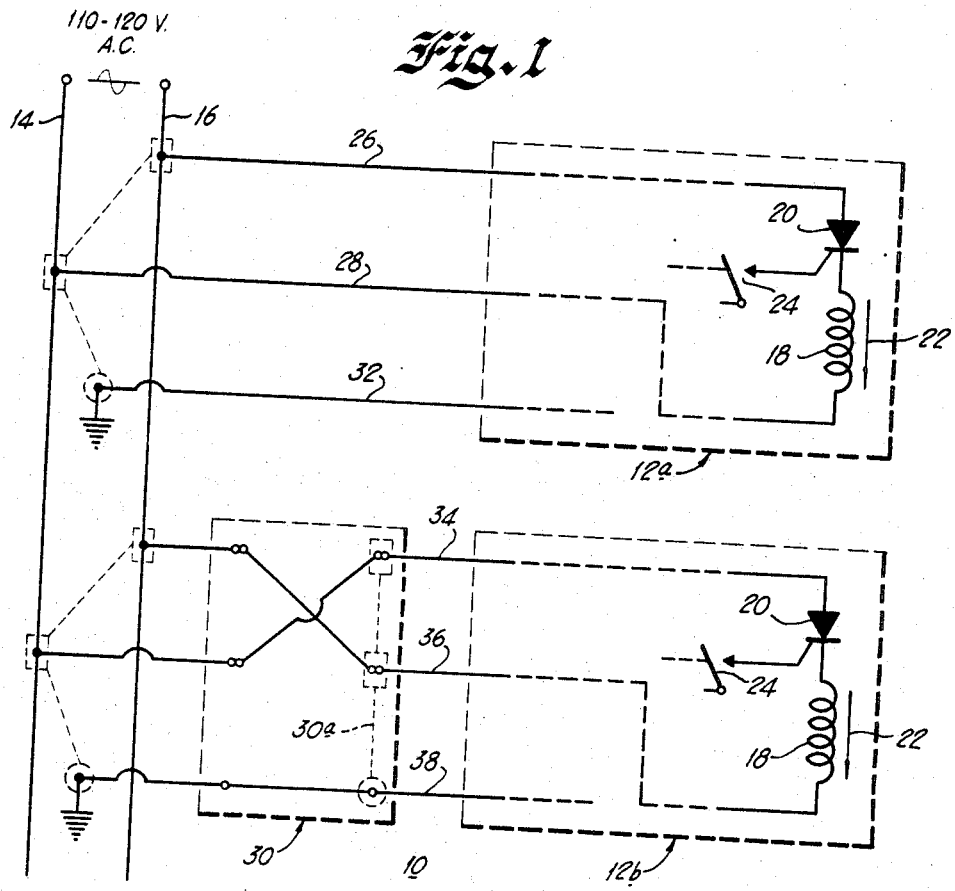

The present invention relates to a new and improved system for controlling the operation of a plurality of tools and, more particularly, to a system including means for preventing the concurrent energization of a pair of electrical tools operated at random intervals.

Electrically operated tools, such as staplers, chisels, nailers, riveters, punchers, scraping tools, staking tools, stud drivers, and hog rig tools, using a single power stroke for each operation, require a relatively large quantity of electrical energy during the relatively short duration of each power stroke. In many assembly line operations, large numbers of tools are required along the line at various locations for operation at random times to perform various functions. The chance of two or more tools being operated at the exact same instant is relatively small owing to the relatively short time duration of the power strokes of the tools. However, when larger numbers of tools are added to a single power distribution circuit, the possibility of simultaneous tool operation increases proportionately, and it is sometimes necessary to increase the size of the distribution system to prevent circuit breakers or other line protective devices from opening the line. In many instances, increasing the size of the electrical distribution system along an assembly line would be extremely costly and sometimes would necessitate the installation of a new electrical system throughout the entire plant. Furthermore, the cost of a new installation frequently would not be justified because the average current drain on the line over an extended period of time might be well within the limits of the circuit, even though the instantaneous or peak current flow would be higher than the design limit.

The concurrent energization of a pair or plurality of tools also presents the problem of insufficient energy being available for the tools. As an example, a single electrically operated fastener driving tool can draw in excess of 90 amperes for no more than a single cycle of the input potential, and this peak current can be drawn from a circuit fused as low as 15 amperes. However, if two of these tools are energized during a single cycle, the line is not capable of supplying the necessary current, and the tools will not fully drive the fastener.

Accordingly, it is an object of the present invention to provide a new and improved electrical system which eliminates or greatly reduces the above difficulties.

Another object of the present invention is the provision of a new and improved electrical system that greatly reduces the chances of circuit overloading by the random, simultaneous operation of more than one electrical appliance or tool on the circuit.

Another object of the present invention is the provision of a new and improved electrical system including a plurality of electrical appliances wherein selected ones of the appliances can only be operated during alternations of the current potential in one direction and selected others can only be operated during current potential alternations in an opposite direction.

Yet another object of the present invention is to provide a new and improved electrical system including a plurality of electrical tools operated from a common source of alternating potential wherein only selected ones of said appliances can be operated during any given half cycle of selected polarity.

Still another object of the present invention is the provision of a new and improved control system for controlling the operation of a plurality of electrical appliances from a common source of alternating potential.

In accordance with these and many other objects, one embodiment of the present invention includes a pair or more of electrical appliances or tools operated from a common source of alternating current potential. Each electrical tool includes an electrical load, such as a resistance or coil, and a controlled conductive device for controlling the flow of current through the load. First control means, connected to or forming a part of one of the tools, is operable at random times by an operator to energize the tool only on half cycles of alternation in the current source of a selected polarity. Second control means, connected to or forming a part of the other one of the tools, is operable at random times by an operator to energize the tool only on half cycles of alternation in the current source of a polarity opposite to the selected polarity of the first tool. In this manner, the tools, even though connected to a common source of alternating current potential, are prevented from being operated at the same instant of time and, accordingly, there is little chance of overloading the current supply circuit. When additional tools are connected to the line, the control means of each additional tool is connected so that half of the additional tools can only be operated during positive half cycles and the other half during negative half cycles. This reduces by one half the chances that any two or more tools would be operated on the same cycle and permits a much larger number of tools to be connected to a single supply circuit of given size.

Figure 2:
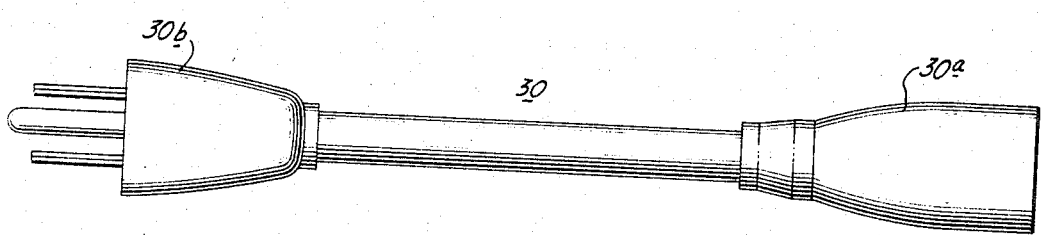

Many other objects and advantages of the present invention will become apparent from consideration of the following detailed description in conjunction with the drawings, in which:

FIG. 1 is a schematic diagram of an electrical system embodying the present invention; and FIG. 2 is a side view of one embodiment of an electrical adapter utilized in the present invention.

Referring now to the drawings, therein is illustrated a new and improved electrical system 10 constructed in accordance with the present invention. The system 10 includes a pair of electrically operated appliances indicated schematically by the dotted rectangular blocks 12a and 12b. For example, the appliances may be single power stroke, portable, electric tools, such as staplers or tackers, of the type illustrated and described in U.S. Patent No. 3,179,866. The tools are connected to a common source of alternating current potential, such as a standard 110–120 volt A.C. distribution circuit indicated by the parallel conductors 14 and 16.

Each tool or appliance includes some type of electrical load therein, for example, an operating winding or coil 18. A controlled conductive device for controlling the current through the coil, such as a gated silicon rectifier 20, is connected in series with load across the A.C. line. A relatively large amount of electrical energy is required during each single power stroke in these types of tools to drive the staples or nails and, for this reason, it is desirable to connect the coils 18 directly across the A.C. line. Because the coils are of relatively low impedance (in the range of 1 to 2 ohms) a relatively high instantaneous current (in the range of 60 to 120 amps) flows during conduction, but the high current flow is of relatively short duration and usually is not sufficient to open the current protective devices on the line, such as a circuit breaker or equivalent. Because these types of tools are not operated continuously, as a saw or drill might be, and because the tools are operated at random times, there is little chance that two or more tools will be actuated during any given cycle or half cycle of alternation of the current source. However, if this possibility does occur, or several tools are actuated in successive cycles of alternation, the current flow could be high enough and long enough in duration to overload the circuit, heat up the distribution lines, and open the circuit breakers.

The gated rectifiers 20 are connected in series with their respective coils 18 across the A.C. line and permit only a unidirectional current flow through the coils, as indicated by the arrows 22. Control of the current flow through the rectifiers during positive half cycles of alternation is effected by suitable control circuitry for each tool, such as the control circuit illustrated and described in the aforementioned U.S. patent. These types of control circuits supply a gating pulse to the gate of the silicon rectifier 18, causing the rectifier to conduct and energize the coil with current flow in the direction shown by arrows 22.

Initiation of the gating pulses is controlled by manually operated triggers on the tools, which are operable at random times by the tool operator, to close a normally open switch 24 and supply the gating potential to the rectifier gate. The control circuit for the tool shown in the previously mentioned patent is designed so that the tool will operate on the first complete positive half cycle occurring after the trigger is depressed, and the current flow through the coil 18 is cut off by the rectifier 20 when the polarity reverses during the succeeding negative half cycle. This is true even though the operator may continue to hold the trigger in a depressed condition for several cycles of alternation. It is necessary to release the trigger to open the switch 24 before another power stroke can be initiated.

Referring to FIG. 1, the anode of the gated rectifier 20 of the tool 12a is connected to the line 16 of the A.C. supply circuit through a flexible lead wire 26, and the cathode of the rectifier is connected to the line 14 through a flexible lead wire 28. Accordingly, the tool 12a can only operate on positive half-cycle alternations of the A.C. power source, that is, when the line 16 is positive with respect to the line 14. To prevent the tool 12b from operating at the same instant as the tool 12a, or at any time when the line 16 is positive with respect to line 14, the tool 12b is connected across the A.C. line with a polarity reversing connector 30 shown schematically in FIG. 1 and physically in FIG. 2.

The tools 12a and 12b and their respective control systems are identical in construction and wiring, and each is provided with a standard three-prong plug at the end of a flexible power cord for connecting the tool to an electrical power source. The tool 12a includes a power cord and plug having the wires 26, 28 and a casing or housing ground wire 32.

The tool 12b is likewise provided with a similar power cord and grounded plug, including a lead wire 34 connected to the anode of the gated rectifier 20, a lead wire 36 connected through the coil 18 to the cathode of the rectifier, and a ground wire 38 connected to the housing or casing of the tool. The plug on the end of the power cord of the tool 12b is connected to a female socket 30b in the end of the polarity reversing connector 30, and the other end of the connector is provided with a standard three-prong plug 30b for connection to the A.C. supply circuit.

Referring again to FIG. 1, it will be seen that the anode lead wire 34 of the tool 12b is connected to the A.C. line wire 14, and the cathode lead wire 36 is connected to the A.C. line wire 16. Accordingly, the tool 12b can only be operated on half cycle alternations when the line 14 is positive with respect to the line 16. This is just the reverse of the tool 12a, which can only be operated during half-cycle alternations when the line 16 is positive with respect to the line 14. Accordingly, the tools 12a and 12b are positively prevented from simultaneous operation during the same half cycle of the A.C. source.

When large numbers of tools are connected to a single A.C. supply circuit, as in many factory assembly lines, every other tool along the line is provided with a polarity reversing connector 30 and, accordingly, half of the tools can be operated only during positive going half cycles of alternation of the supply current while the other half can only be operated during negative going half cycles of current alternation. The chances of two or more tools on the circuit being operated simultaneously are thus reduced in half, and presently existing supply circuits, are capable of supplying twice as many tools without danger of overload and heating.

In a typical installation, a 20 ampere supply circuit can be used to supply twenty or more tools. During a power stroke, a tool may draw as high as 120 amperes for a maximum time of one-half cycle or $\frac{1}{120}$ of a second on a 60 cycle A.C. system. Thus, even if it were possible to operate each tool of the twenty, once each second, or sixty times a minute, the average line current would only reach the rated 20 amperes. It is doubtful that even if automatic nailing machines now available could be operated more than once every two seconds, and in a usual assembly line operation with portable, randomly operated tools, operations would be more in the range of ten to twenty power strokes a minute.

The present invention provides a means for further reducing the possibility that two or more tools would be operated at the exact same instant and permits doubling of the maximum number of tools that can be utilized on a supply circuit of given size.

Although the present invention has been described with reference to a single illustrative embodiment thereof, it should be understood that numerous other modifications and embodiments can be devised by those skilled in the art that will fall within the spirit and scope of this invention.

What is claimed and desired to be secured by Letters Patent of the United States is:

1. In combination with a common source of A.C. potential, a plurality of identical electrically powered appliances, each appliance including a circuit comprising a unidirectional conductive device arranged in the same polarity and in series with a load and switch means operable at random times with respect to said A.C. source for rendering said device conductive, first polarized connector means for connecting the circuits of a first group of said appliances to said A.C. source for conduction through the loads thereof only during half cycles of alternating current of one polarity, and second polarized connector means for connecting the circuits of a second group of said appliances to said A.C. source for conduction through the loads thereof only during half cycles of alternating current of the opposite polarity.

2. The combination of claim 1 wherein said switch means is operable to gate the unidirectional conductive device for conducting current through said load.

References Cited

UNITED STATES PATENTS

| | | | |
|---|---|---|---|
| 3,220,356 | 11/1965 | Leslie | 318—55 X |
| 3,189,748 | 6/1965 | McMurray | 307—41 |
| 3,316,427 | 4/1967 | Muskovac | 315—196 X |

ORIS L. RADER, *Primary Examiner.*

W. E. DUNCANSON, *Assistant Examiner.*

U.S. Cl. X.R.

307—146